(12) United States Patent
Bremer et al.

(10) Patent No.: US 6,658,096 B2
(45) Date of Patent: *Dec. 2, 2003

(54) LOCAL LOOP INTERCEDER

(75) Inventors: Gordon Bremer, Clearwater, FL (US); Thomas Bingel, Belleair Beach, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/021,590

(22) Filed: Oct. 30, 2001

(65) Prior Publication Data

US 2002/0041662 A1 Apr. 11, 2002

Related U.S. Application Data

(63) Continuation of application No. 09/031,268, filed on Feb. 26, 1998, now Pat. No. 6,408,506.

(51) Int. Cl.[7] .............................................. H04M 11/00
(52) U.S. Cl. .............................. 379/93.05; 379/93.07; 379/93.09; 379/93.14
(58) Field of Search ................ 379/90.01, 93.05–93.07, 379/93.09, 93.11, 93.14, 156, 219, 220.01, 134, 154, 201.01, 399.01; 370/351–352

(56) References Cited

U.S. PATENT DOCUMENTS

| | | | | |
|---|---|---|---|---|
| 5,635,980 A | * | 6/1997 | Lin et al. ................. | 379/93.07 |
| 5,828,666 A | * | 10/1998 | Focsaneanu et al. ........ | 370/351 |
| 5,974,043 A | * | 10/1999 | Solomon .................... | 370/352 |
| 6,029,047 A | * | 2/2000 | Ishida et al. ............. | 379/93.07 |
| 6,173,044 B1 | * | 1/2001 | Hortensius et al. ...... | 379/93.09 |
| 6,298,121 B1 | * | 10/2001 | Samson et al. ........ | 379/100.15 |
| 6,408,056 B1 | * | 6/2002 | Bremer et al. ........... | 379/93.05 |

* cited by examiner

*Primary Examiner*—George Eng
(74) *Attorney, Agent, or Firm*—Thomas, Kayden, Horstemeyer & Risley, LLP

(57) ABSTRACT

Disclosed is a local loop interceder which interfaces between the local loop and the central office and which provides access to the public switched telephone network (PSTN). The local loop interceder establishes a first signal pathway from the local loop to the PSTN and a second signal pathway from the local loop to a high speed data modem. The local loop interceder alternates between the first and second pathways depending upon whether the end user desires voice or data communication on the local loop. In a second embodiment, the high speed data modem is a simultaneous voice and data (SVD) modem. In such case, the local loop interceder provides a third signal pathway from the SVD modem to the PSTN for voice communication which is demodulated from a simultaneous voice and data signal received by the SVD modem through the second signal pathway.

40 Claims, 8 Drawing Sheets

LOCAL LOOP INTERCEDER

CLAIM OF PRIORITY

This application is a continuation of, and claims the priority to and benefit of the filing date of, U.S. utility application entitled, "LOCAL LOOP INTERCEDER," having Ser. No. 09/031,268, filed Feb. 26, 1998, U.S. Pat. No. 6,408,056, which is entirely incorporated herein by reference.

FIELD OF THE INVENTION

The present invention generally relates to the field of telecommunications, and more particularly, to the field of shared voice and data communications on existing electrical two-wire pairs.

BACKGROUND OF THE INVENTION

Data communication via the public switched telephone network (PSTN) is ever increasing. As known to those skilled in the art, the PSTN is comprised of local and/or central offices which provide telephone service to end users. Typically, the end user is connected to the central office by a two-wire pair which is also called a local loop. More and more, these two-wire pairs are employed for data communication using digital subscriber loop (DSL) technology to facilitate high speed data communication.

Due to the demand for both voice and data communication using existing two-wire pairs, telephone service providers presently achieve concurrent telephone operation and high speed data operation using digital subscriber loop (DSL) technologies. In particular, plain old telephone service (POTS) uses a bandwidth of approximately 100–4000 Hertz to communicate voice signals. Data communication using DSL technologies typically operates at a bandwidth with a lower cutoff frequency of approximately 30 Kilohertz and an upper cutoff frequency that varies significantly depending on the specific type of DSL technology employed. Concurrent voice and data communication is established on the same local loop as the bandwidths do not overlap.

As is known in the art, however, when DSL and voice POTS communications share a two-wire pair, POTS-splitters are required at the customer premises. As is further known, POTS-splitters electronically filter the low frequency POTS signals from reaching DSL communication devices, and the relatively high frequency DSL signals from reaching the POTS devices such as telephones, facsimile machines, modems, etc. Unfortunately, the installation of POTS-splitters imposes a relatively significant and undesired cost burden on the customer.

To explain further, a POTS-splitter includes a low pass filter that rejects signals at frequencies higher than the 100–4000 Hertz frequency bandwidth. Also, most DSL technologies include a front-end high pass filter that rejects any frequencies below the 30 Kilohertz cutoff. POTS-splitters may be installed at the customer premises at the point of entry of the local loop into the customer premises or at each POTS device. Either manner of installation may present significant cost to the consumer.

Another additional cost imposed with the use of POTS-splitters is cost of installation of POTS-splitters at the central office side of the local loop. This cost creates an additional barrier to the use of high speed data communication devices such as DSL or other technology.

In addition, POTS-splitters also cause problems for data communication using technology other than DSL. Specifically, with these technologies, the local loop cannot be used for communication below 30 Kilohertz when POTS-splitters are employed even though POTS service is not being used. This reduces the potential data rates by as much as 256 Kbps.

Accordingly, there is a need to provide a system that allows shared (e.g., voice and high speed data) usage of a two-wire pair, without the expense associated with DSL services. In addition, there is also a need for technology which will allow data communication using the full bandwidth available when POTS is inactive on the local loop, thereby maximizing the rate of data communication.

SUMMARY OF THE INVENTION

According to a first embodiment of the present invention, a local loop interceder is installed in a central office into the local loop that will allow the local loop to be used for voice or data communication. The local loop interceder features a switching mechanism having a first position and a second position which define both a first and a second signal pathway. The first signal pathway is capable of electrically coupling the local loop to a switched telephone network at the central office, thereby facilitating electrical communication between the local loop and the public switched telephone network (PSTN). The second signal pathway is capable of electrically coupling the local loop to a high speed data communication device, thereby facilitating electrical communication between the local loop and the high speed data communication device which acts as an interface for high speed data communication networks. The local loop interceder of the first embodiment also includes sensing circuitry to various signal activity and other system conditions to control the interceder functions.

According to a second embodiment, there is provided a local loop interceder which, in addition to the features of the first embodiment, includes a third signal pathway which facilitates transmission from the high speed data communication device to the PSTN, thereby facilitating the communication of a voice signal between the high speed data communication device and the PSTN. According to the second embodiment, the high speed data communication device facilitates the communication of simultaneous voice and data (SVD). Consequently, the local loop interceder according to the second embodiment provides a first signal pathway from the local loop to the PSTN for regular telephone service on the local loop. Also provided is a second signal pathway to facilitate the transmission of a data signal or an SVD signal from the local loop to an SVD modem. Finally, the third signal pathway is provided between the SVD modem to the PSTN to be used to transmit a voice signal demodulated from a simultaneous voice and data signal received from the local loop to the PSTN.

Additionally, it should be noted that the present invention does not require telephone company installation of equipment at the customer premises, thereby reducing the cost barrier that prohibits the use of DSL and other high speed data communication technology by the average end user.

The present invention can also be conceptualized as providing a method for electrically coupling a switched telephone network, a data communication device, and a local loop to facilitate voice and data communications. In this regard, the method can be broadly summarized by the following steps: providing a first and second signal pathways to couple respectively the local loop to the switched telephone network and the local loop to the data communication device; sensing signal activity on said first and second signal pathways; and coupling the local loop to the data communication device or the local loop to the switched telephone network based upon the sensed signal activity.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
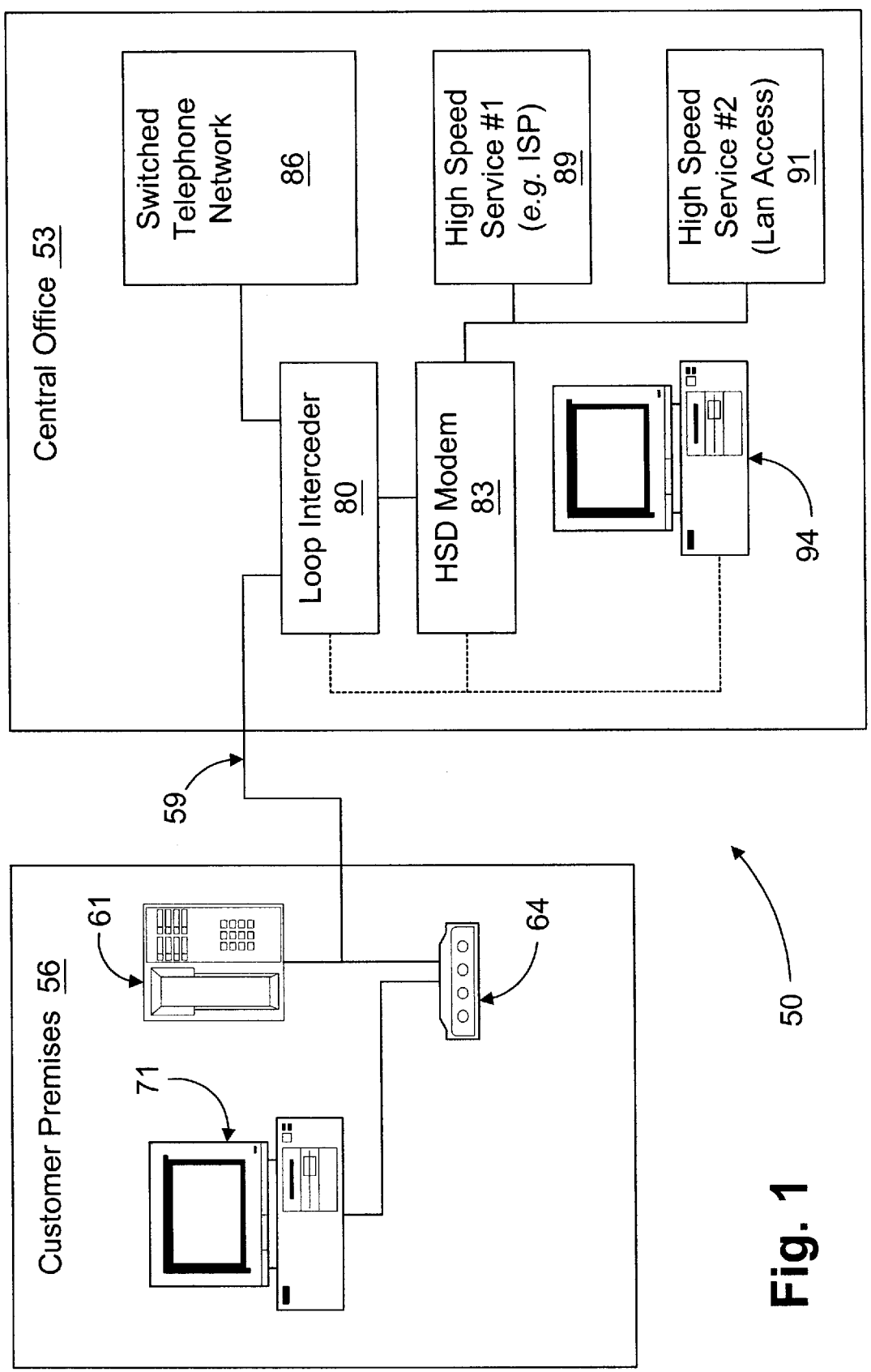
FIG. 1 is block diagram of a communications system incorporating a local loop interceder according to a first embodiment of the present invention.

Turning to the drawings, FIG. 1 shows a communications system 50 according to one embodiment of the present invention. Represented are a central office 53 and customer premises 56 which are linked by a two-wire pair which is also referred to as the local loop 59. At the customer premises 56 the local loop 59 is electrically coupled to a line telephone 61 and a high speed modem 64. The high speed modem 64 may employ DSL technology or other data communications devices. Generally, the local loop 59 is comprised of the communications equipment that is linked to it in the customer premises 56 and the central office 53 as is known in the art. Typically, the line telephone 61 and the high speed modem 64 are linked to the local loop 59 by plugging into standard telephone wall jacks. Computer 71 is electrically coupled to the high speed modem 64. The computer 71 may connect to the high speed modem 64 through standard data communication equipment-data terminal equipment (DCE-DTE) cables, or the high speed modem 64 may actually be resident inside the computer 71.

In the central office 53, the local loop 59 is terminated at a local loop interceder 80. The local loop interceder 80 is in turn electrically coupled to and in electrical communication with a central office high speed modem 83 which is generally a companion to the high speed modem 64. The local loop interceder 80 is also electrically coupled to the switched telephone network 86 to facilitate the routing of voice traffic on the local loop. The central office high speed modem 83 is linked, for example, to a high speed data service 89, such as an internet service provider (ISP), and the local area network high speed service 91 to facilitate data transmission. Note that the high speed services may include other types of data communication not shown, but known in the art. Finally, included in the central office 53 is an optional control computer 94, which may be installed in electrical communication with the local loop interceder 80 and the central office high speed modem 83 to handle billing and maintenance concerns.

Figure 2:
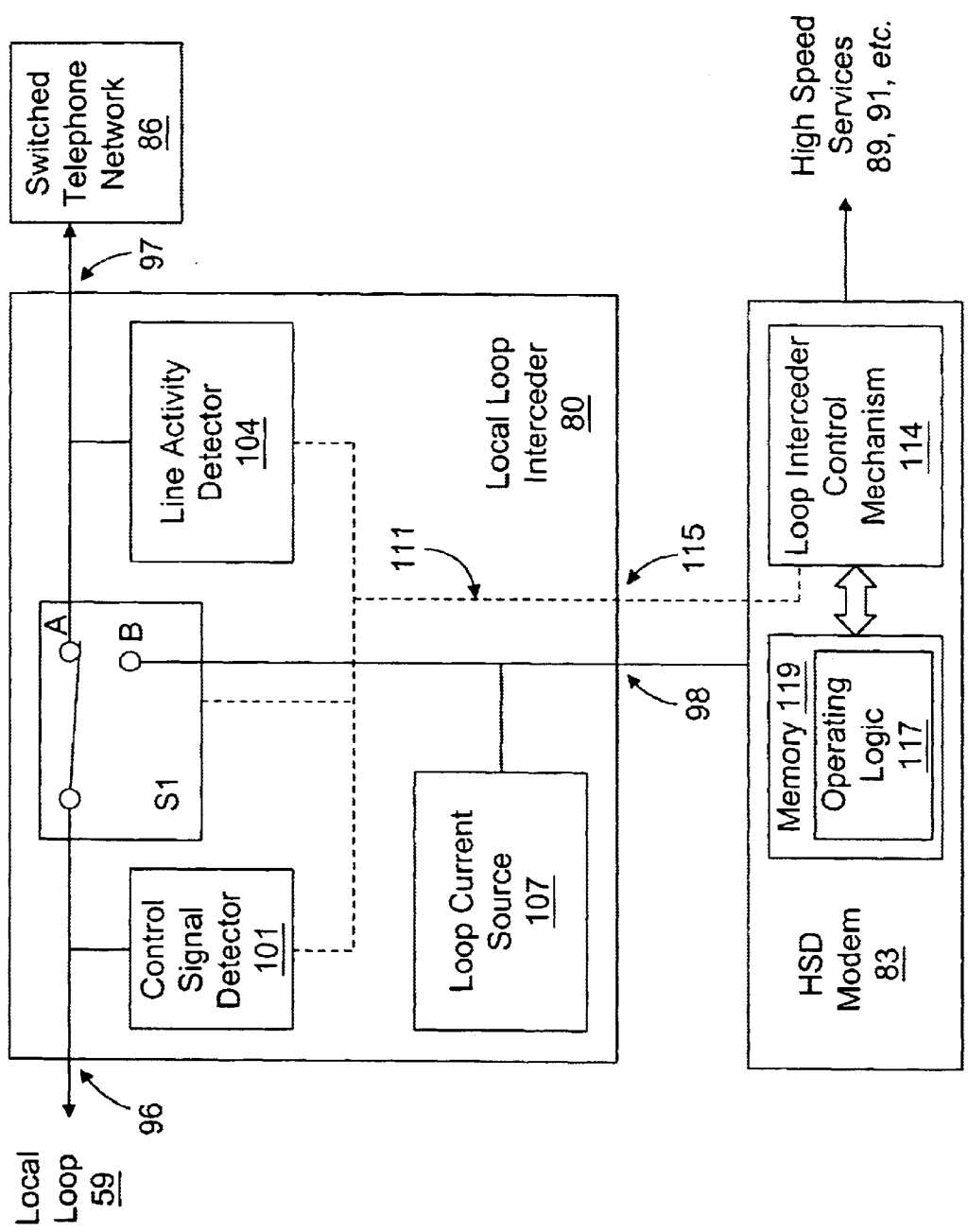
FIG. 2 is a block diagram showing components of the local loop interceder of FIG. 1.

Turning now to FIG. 2, shown is a block diagram of the local loop interceder 80 according to the first embodiment of the present invention. Also shown in electrical communication with the local loop interceder 80 is the central office high speed modem 83. The local loop 59 is coupled to the local loop interceder 80 through a local loop port 96 through which electrical communication is received and transmitted from and to communications equipment on the local loop 59. Likewise, the switched telephone network 86 is coupled to the local loop interceder through a switched telephone network port 97, and the high speed modem 83 is coupled to the local loop interceder 80 through a high speed modem port 98. These ports may be of a hardwire or plug-in variety as known in the art.

The principal components of the local loop interceder 80 comprise a control signal detector 101, a switching mechanism S1, a line activity detector 104, and a loop current source 107. These components are in electrical communication with a loop interceder control mechanism 114, located in the central office high speed modem 83 via the control bus 111 through a control bus port 115. The loop interceder control mechanism 114 operates according to operating logic 117 stored on the control system memory 119.

To explain the operation of the above components, we begin with the switching mechanism S1. Note that the switching mechanism S1 may be any device suitable for switching signals between switched telephone network 86 and high speed modem 83. In this regard, FIG. 2 shows a simple switch used as the switching device S1. However, other types of switching devices such as electromechanical switches (e.g., relays) and solid state switches (e.g., transistors), for example, are also possible.

In the first embodiment, the switching mechanism S1 features positions A and B. When in position A, a first signal pathway is established from the local loop 59 directly to the switched telephone network 86. When in position B, a second signal pathway is established from the local loop 59 to the central office high speed modem 83. The switching mechanism S1 is placed in position A when standard switched telephone service is desired on the local loop 59. However, when high speed data communication is desired through the central office high speed modem 83, then the switching mechanism is placed in position B. Generally, the default position of the switching mechanism is position A.

The control signal detector 101 and the line activity detector 104 sense the conditions by which the position of the switching mechanism S1 is controlled. Specifically, the control signal detector 101 and the line activity detector 104 send data about the signal activity on the local loop 59 or from switched telephone network 86 to the loop interceder control mechanism 114, which in turn controls the switching mechanism S1 based on the operating logic 117 stored in the control mechanism memory 119.

In the first embodiment, conditions sensed by the control signal detector 101 include a line telephone 61 off-hook, or a request from the high speed modem 64 (FIG. 1) for high speed data communication with the central office high speed modem 83. The off-hook condition is generally detected by a 20 mA to 100 mA signal on the line as known to those skilled in the art. The request for high speed data communication comprises a request signal transmitted from high speed modem 64 that is reliably detected by the control signal detector 101 and that is not usually transmitted by typical telephone equipment such as, for example, a tone at about 25 KHz.

The control signal detector 101 communicates the existence of these line conditions via the control bus 111. The control bus 111 preferably includes a plurality of connectors for communication with the loop interceder control mechanism 114. The control detector 101 preferably transmits a particular signal for each relative condition detected by transmitting a particular combination of high and low signals across the plurality of connectors. In this way, the control detector 101 informs the loop interceder control mechanism 114 of the condition detected by the control detector 101. Of course, other manners of communication between the control signal detector 101 and the loop interceder control mechanism 114 may be implemented. For example, the control bus 111 may be a serial communication bus, and the control signal detector 101 may communicate serially to the loop interceder control mechanism 114.

The line activity detector 104 senses incoming telephone calls from the switched telephone network 86. In particular, the line activity detector 104 senses a ring signal or caller identification signals from the switched telephone network 86. As was the case with the control signal detector 101, these conditions are communicated to the loop interceder control mechanism 114 via the control bus. Also, as was the case with the control signal detector 101, the line activity detector 104 may be implemented through circuitry and methods that are readily understood by those skilled in the art, and need not be described herein in detail.

The loop current source 107 provides current to the local loop 59 when the switching mechanism S1 is in position B. This current source is not necessary when in position A as a like current source is provided by the switched telephone network 86.

Also, the switching mechanism S1 may comprise a mechanical or solid state switch. In the preferred embodiment, the switching mechanism S1 is responsive to a discrete signal transmitted across the control bus 111 which directs the switching mechanism to either the A or B position.

Note that further hardware configurations to accomplish the tasks of the control signal detector 101, the switching mechanism S1, and the line activity detector 104 include an application specific integrated circuit (ASIC) on which each component may be placed. Also, a digital signal processor (DSP) may be employed to perform the tasks of all three components.

Figure 3:
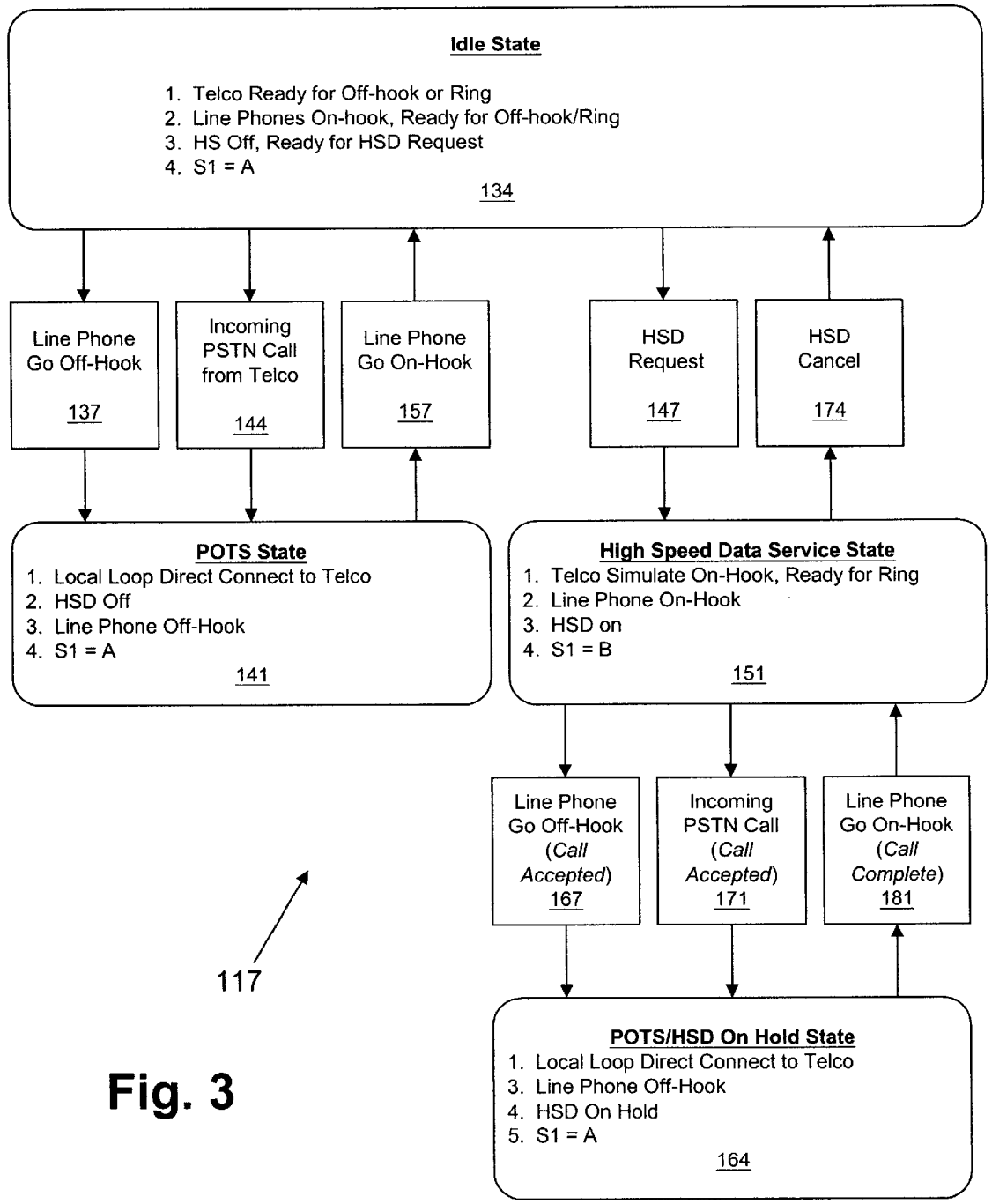
FIG. 3 is a state diagram which depicts the operation of the local loop interceder of FIGS. 1 and 2.

Turning then to FIG. 3, shown is a state diagram of the operating logic 117 (FIG. 2) stored on memory 119 (FIG. 2) by which the loop interceder control mechanism 114 (FIG. 2) operates in accordance with the first embodiment of the instant invention. In FIG. 3, the blocks with the rounded edges represent the states of the operation of the loop interceder control mechanism 114 and the blocks with the square edges represent conditions to which the loop interceder control mechanism 114 reacts. The states shown are generally the states of operation of the local loop interceder 80 (FIG. 2) as controlled by the loop interceder control mechanism 114 pursuant to the operating logic 117 (FIG. 2). In the idle state 134, the line telephone 61 (FIG. 1) is on-hook. The switched telephone network 86 (FIG. 2) is ready for an incoming or outgoing telephone call. The central office high speed modem 83 (FIG. 2) is inactive, but ready to receive data communication from a high speed service port 89 or 91 (FIG. 1). Finally, the switching mechanism S1 is located at the A position, thereby establishing the first signal pathway connecting the local loop 59 (FIG. 1) to the switched telephone network 86 (FIG. 1)

When in the idle state, various conditions may occur that cause the loop interceder control mechanism 114 to change to a different state. For example, if the line telephone 61 goes off-hook (condition 137), a 20 mA to 100 mA signal is created in the local loop 59 which is detected by the control signal detector 101. A signal is then sent by the control signal detector 101 to the loop interceder control mechanism 114, which changes to a plain old telephone system (POTS) state 141. Likewise, if the switched telephone network 86 rings the local loop 59 (condition 144) in order to establish an incoming call to the customer premises 56 (FIG. 1), the line activity detector 104 detects the ringing on the line and any caller identification signal. The line activity detector 104 then communicates the existence of the this activity to the loop interceder control mechanism 114 which changes to the POTS state 141. The line telephone 61 rings at the customer premises and may be answered to establish the telephone call.

If high speed data communication service is requested from the computer 71 (FIG. 1) at the customer premises 56 (condition 147) while in the idle state 134, then the high speed data request signal is detected on the local loop 59 by the control signal detector 101, which communicates the request to the loop interceder control mechanism 114 via the control bus 111, which changes to the high speed data service state 151.

Once the loop interceder control mechanism 114 is in the POTS state 141, the switching mechanism S1 is retained at position A, thereby establishing a direct connection between the local loop 59 and the switched telephone network 86. The line telephone 61 is off-hook in order for the end user to participate in a telephone conversation. All high speed data communication equipment are inactive.

If the line telephone 61 is placed back on hook (condition 157) after a telephone call is completed while in the POTS state 141, then the on-hook condition is detected by the line activity detector 104 which communicates the condition to the loop interceder control mechanism 114. The loop interceder control mechanism 114 then changes back to the idle state 134.

While in the high speed data service state 151, the loop interceder 80 (FIG. 2) establishes a signal pathway between the local loop 59 and the central office high speed modem 83. The switching mechanism S1 is kept in position B and the line telephone 61 is on-hook. While in this state, the high speed data modem 64 (FIG. 1) is in electrical communication with the central office high speed modem 83.

There are various conditions which cause the loop interceder control mechanism 114 to move out of the high speed data service state 151. These include the line telephone 61 going off-hook (condition 167) to place a telephone call, or an incoming telephone call from the switched telephone network 86 (condition 171), as sensed by the line activity detector 104 which communicates the existence of the incoming call to the loop interceder control mechanism 114. In the case of conditions 167 and 171, the operating logic 119 of the loop interceder control mechanism 114 decides whether to accept or reject the telephone call from the line telephone 61 or from the switched telephone network 86. If the call is accepted from one of these sources, then the loop interceder control mechanism 114 changes to the POTS/high speed data on hold state 164.

Whether a telephone call is accepted either from the line telephone 61 or the switched telephone network 86 may be configured by the user at the customer premises. If where the user has configured the system to reject incoming PSTN telephone calls, an incoming call may simply ring without being answered. Also, the line telephone 61 does not receive a dial tone to place an outgoing call.

If as in condition 174, the high speed data communication is terminated while the loop interceder control mechanism 114 is in the high speed data service state 151, then the loop interceder control mechanism 114 changes to the idle state 134.

Finally, when the loop interceder control mechanism 114 is in the POTS/high speed data on hold state 164, the high speed data communication is placed on hold and the switching mechanism is located in position A, thereby establishing the signal pathway between the local loop 59 and the switched telephone network 86. The line telephone 61 is off-hook.

The loop interceder control mechanism 114 changes from the POTS/high speed data on hold state 164 to the high speed data service state 151 when the line telephone 61 goes on-hook (condition 181), thereby reinstating high speed data communication.

Figure 4:
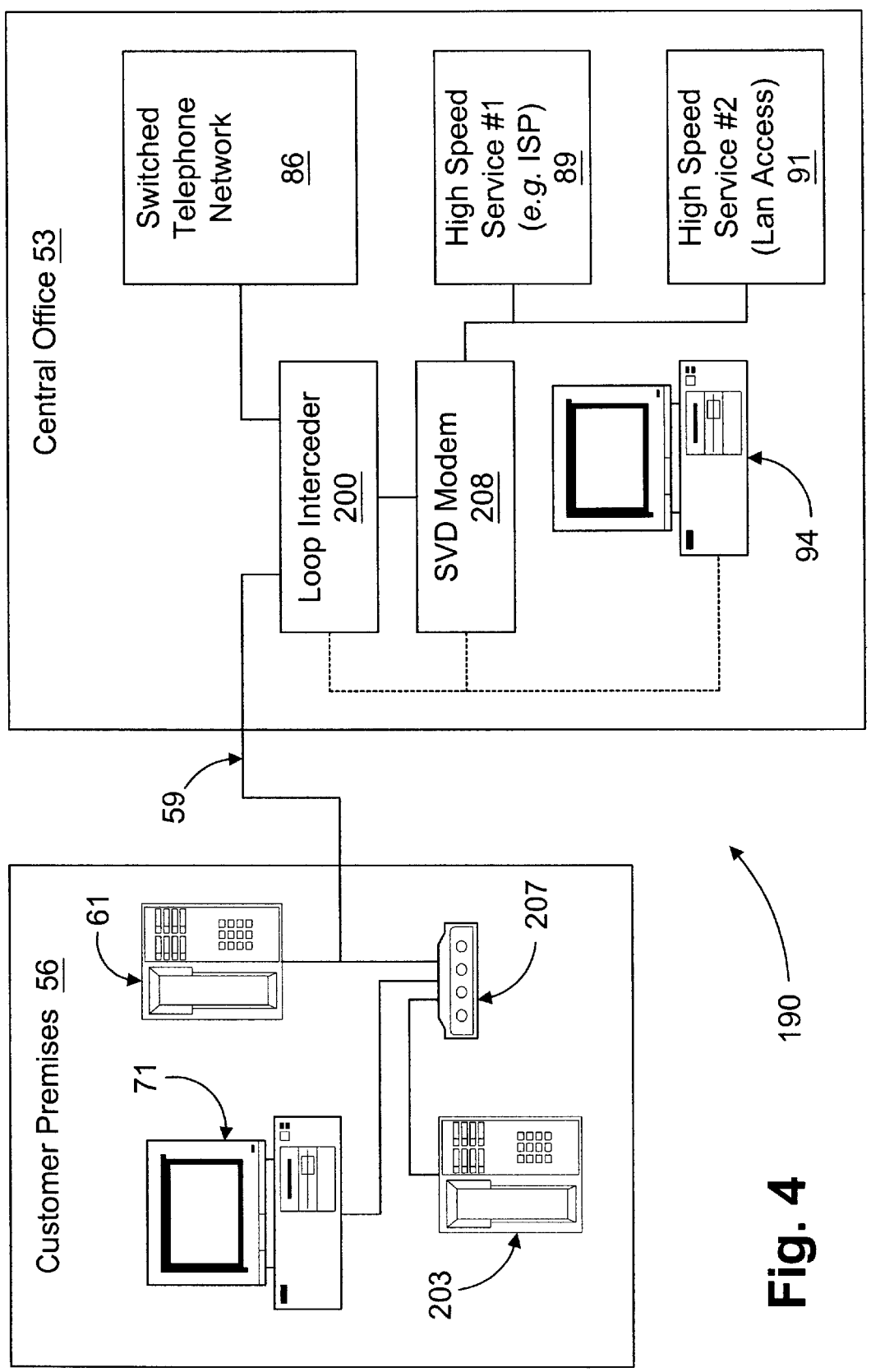
FIG. 4 is block diagram of a communications system incorporating a local loop interceder according to a second embodiment of the present invention.

Referring next to FIG. 4, a communications system 190 according to a second embodiment of the instant invention is shown. The communications system 190 features many of the same components as the system of FIG. 1 with a few changes. Specifically, the loop interceder 200, the end user simultaneous voice and data (SVD) modem 207, and the central office SVD modem 208 provide simultaneous voice and data communications capability unavailable in the first embodiment as detailed in the following discussion. Commonly assigned U.S. Pat. No. 5,448,555 entitled "Simultaneous Analog and Digital Communication," filed on Jun. 14, 1993, by Bremer et al,.which is incorporated herein by reference as if fully set forth hereinbelow, describes in detail several embodiments for simultaneous voice and data communications. Also, a modem telephone 203 is electrically coupled to the end user SVD modem 208 through which the voice portion of the SVD communication is received. In this regard, SVD signals from modem telephone 203 can be switched onto local loop 59 within SVD modem 207, or the analog signals to/from modem telephone 203 can be processed into an SVD format within SVD modem 207. For the following description, modem telephone 203 will be described as an SVD phone capable of transmitting SVD signals switched onto local loop 59 within SVD modem 207.

Figure 5:
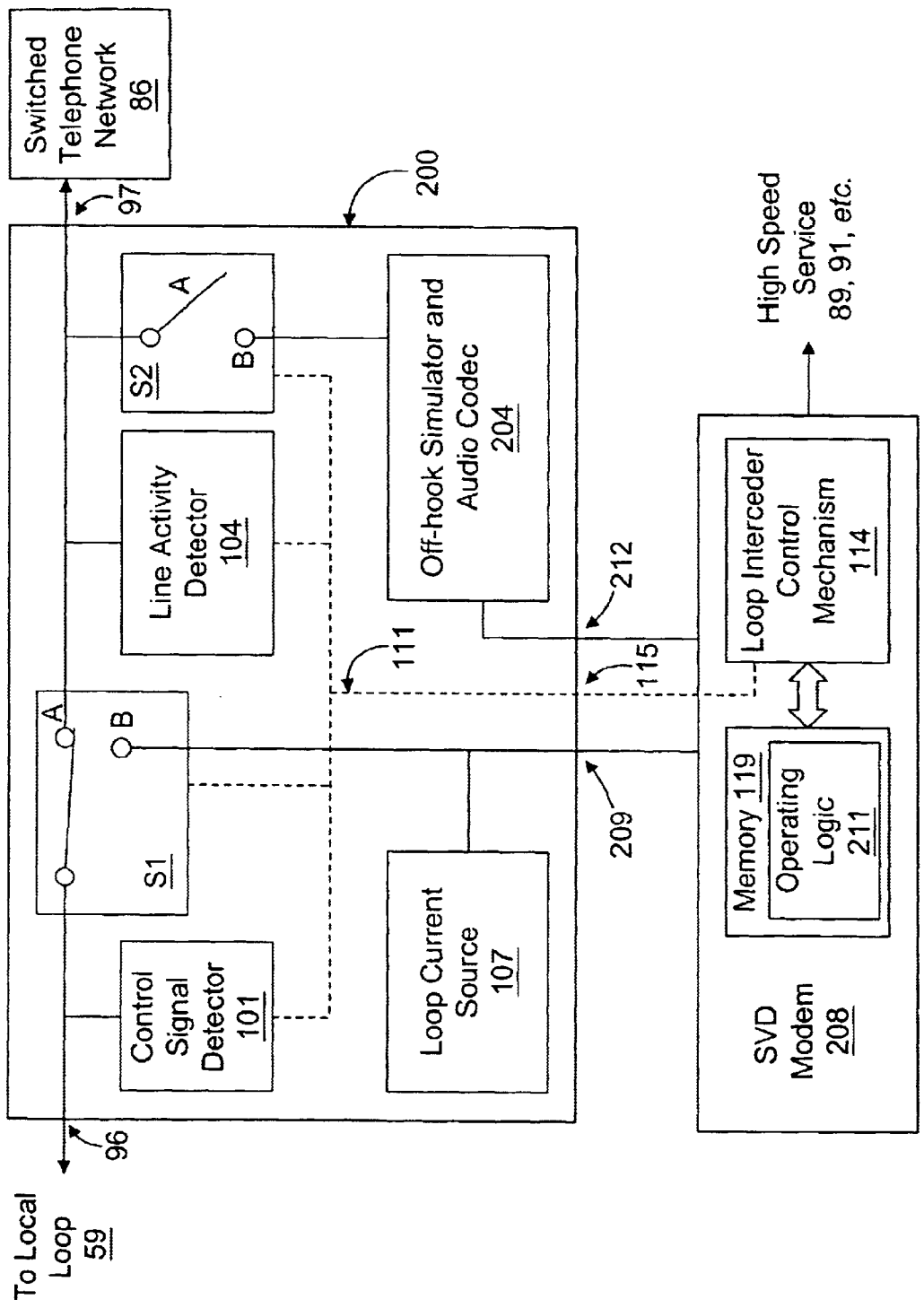
FIG. 5 is a block diagram showing the components of the local loop interceder of FIG. 4.

Turning now to FIG. 5, a block diagram of a local loop interceder 200 according to the second embodiment of the instant invention is shown. Many of the components in the local loop interceder 200 are similar to the first embodiment with a few additions. The SVD modem 208 is electrically coupled to the local loop interceder 200 through a voice/data port 209. Also, a second switching mechanism S2 as well as an off-hook simulator/audio codec 204 are added. The second switching mechanism S2 is electrically coupled with the conductor which connects the first switching mechanism S1 with the switched telephone network 86, and is also electrically coupled to the off-hook simulator/audio codec 204. The second switching mechanism S2 has two positions. When in position A the second switching mechanism S2 is open, and when in position B, it is closed. As was the case with the switching mechanism S1, the second switching mechanism need not actually be a mechanical switch, but is shown as such to facilitate the following discussion. Preferably, the second switching mechanism S2 is a solid-state switch, but it may be any other apparatus which accomplishes its function as is known in the art.

The loop interceder control mechanism 114 operates according to the operating logic 211 stored on memory 119. Also, the off-hook simulator/audio codec 204 is electrically coupled with the central office SVD modem 208 through an SVD voice port 212.

To explain the operation of the second embodiment as described above, the local loop interceder 200 facilitates simultaneous voice and data (SVD) communication from the end user SVD modem 207 across the local loop 59. When the second switching mechanism S2 is in position B or closed, a signal pathway is established from the central office SVD modem 208 to the switched telephone network 86. Essentially, when SVD communication is established between the end user SVD modem 207 and the central office SVD modem 208, the first switching mechanism S1, in position B, routes the SVD signal from the local loop 59 to the central office SVD modem 208. The central office SVD modem 208 demodulates the SVD signal into a separate voice signal and a separate data signal. The data signal is then directed to one of the high speed data services 89 or 91, etc. The voice signal is rerouted back to the local loop interceder 200 to the off-hook simulator/audio codec 204. The voice signal is then decoded from a digital signal to an analog signal and then passed through the second switching mechanism S2 to the switched telephone network 86. Essentially, the addition of the off-hook simulator/audio codec 204 and the second switching mechanism S2 establish a signal pathway through both components for the communication of a voice signal from the central office SVD modem 208 to the switched telephone network 86. The off-hook simulator/audio codec 204 allows the switched telephone network 86 to operate as if the voice signal were being transmitted by a regular telephone on the local loop 59.

Alternatively, the SVD modem 208 can be designed to communicate directly with switched telephone network 86 through digital encoded communication. In this regard, the functionality of the off-hook simulator/audio codec 204 is implemented by SVD modem 208.

The operating logic 211 includes instructions to control the operation of the second switching mechanism S2. When SVD communication is desired, the loop interceder control mechanism 114 locates the first and second switching mechanisms S1 and S2 to positions B so that the separated voice signal may be routed to the switched telephone network 86 while the separated high speed data signal is routed to a high speed service 89, 91, etc.

Figure 6:
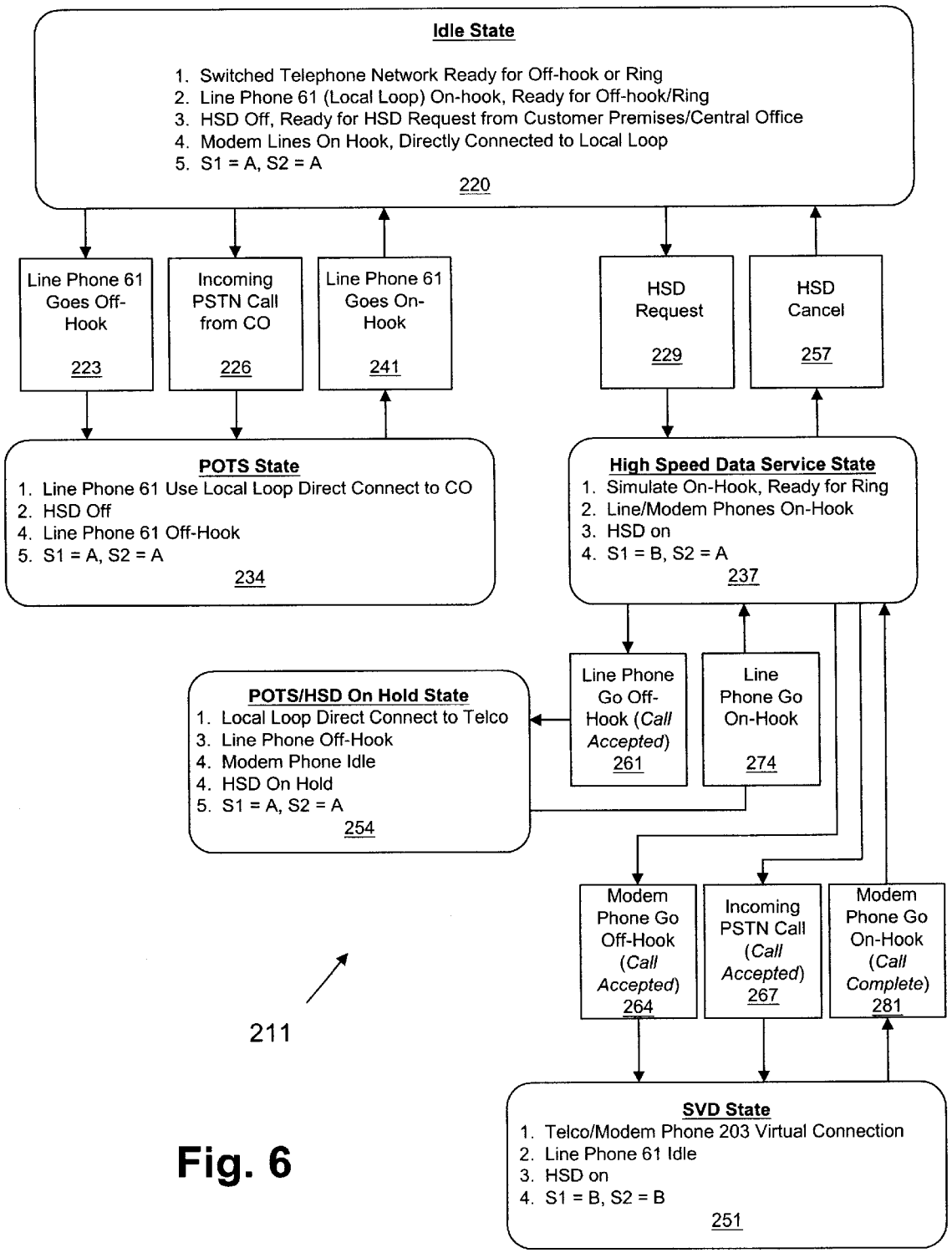
FIG. 6 is a state diagram which depicts the operation of the local loop interceder of FIGS. 4 and 5.

Turning to FIG. 6, a state diagram of the operating logic 211 (FIG. 5) is shown by which the loop interceder control mechanism 114 (FIG. 5) operates in accordance with the second embodiment of the instant invention. The states shown are generally the states of operation of the local loop interceder 200 (FIG. 4) as controlled by the loop interceder control mechanism 114 (FIG. 5) pursuant to the operating logic 211 (FIG. 4). Beginning with the idle state 220, the switched telephone network 86 (FIG. 5) is directly connected to the local loop 59 (FIG. 5) through switching mechanism S1 (FIG. 5) which is in the A position. The high speed data service is inactive, however, the local loop interceder 200 stands ready to detect a request signal for high speed data service from the customer premises 56 (FIG. 4) through the control signal detector 101. Line telephone 61 (FIG. 4) and modem telephones 203 (FIG. 4) are on-hook.

The loop interceder control mechanism 114 leaves the idle state 220 when line telephone 61 goes off-hook (condition 223). The line activity detector 104 senses the 20 mA to 100 mA current when the line telephone 61 goes off-hook and communicates the condition to the loop interceder control mechanism 114 via the control bus 111. In response, the loop interceder control mechanism 114 enters the POTS state 234 where the telephone call is conducted.

The same occurs when an incoming telephone call from the switched telephone network 86 (FIG. 4) rings the local loop 59 with line telephone 61 (condition 226). The ring signals and any caller identification signals are sensed by the line activity detector 104, which informs the loop interceder control mechanism 114 via the control bus 111 which then changes to the POTS state 234.

If high speed data communication is instituted at the end user SVD modem 207 while in the idle state 220 (condition 229), the loop interceder control mechanism 114 changes to the high speed data service state 237 where the central office SVD modem 208 interfaces with any one of a number of high speed data services 89, 91 etc. (FIG. 4). When high speed data communication is instituted by the end user SVD modem 207, the control signal detector 101 senses the data request signal from the end user SVD modem 207, communicating the fact to the loop interceder control mechanism 114. In response, the loop interceder control mechanism 114 operating according to the operating logic 211 changes to the high speed data service state 237. It may be possible that high speed data communication be instituted by the central office SVD modem 208 prompted by a request from any one of the high speed data services 89, 91, etc.

Referring back to the POTS state 234, in this state the line telephone 61 is directly connected to the switched telephone network 86. The high speed data communication is inactive. Both the switching mechanism S1 and the second switching mechanism S2 are in positions A thereby connecting the local loop 59 to the switched telephone network 86.

The loop interceder control mechanism 114 changes to the idle state 220 when the line telephone 61 goes on-hook (condition 241) at the end of the telephone conversation.

With regard to the high speed data service state 237, once the loop interceder control mechanism 114 enters this state, the local loop interceder 200 appears to the switched telephone network 86 as a telephone which is on-hook. Also, the line telephone 61 and the modem telephone 203 are, in fact, on-hook. The switching mechanism S1 is in position B and the second switching mechanism S2 is in position A. Thus high speed data communication is established between the end user SVD modem 207 and the central office SVD modem 208 via the signal pathway established between the local loop 59 and the central office SVD modem 208 through the switching mechanism S1. The central office SVD modem 208 in turn interfaces with one of several high speed services 89, 91, etc.

If, while the loop interceder control mechanism 114 is in the high speed data service state 237, the high speed data communication is canceled (condition 257), then the loop interceder control mechanism 114 changes to the idle state 220.

If the line telephone 61 goes off-hook while in the high speed data service state 237 and the call request is accepted (condition 261), then the loop interceder control mechanism 114 changes to the POTS/HSD on hold state 254 where the high speed data communication is placed on hold until the telephone call is completed.

If the modem telephone 203 goes off-hook while the loop interceder control mechanism 114 is in the high speed data service state 237 (condition 264), then the end user SVD modem 207 produces a simultaneous voice and data signal which is then decoded by the central office SVD modem 208. The central office SVD modem 208 splits the simultaneous signal into individual voice and data signals. The voice signal is routed through the off-hook simulator/audio codec 204 (FIG. 5) and the second switch S2 to the switched telephone network 86. To the switched telephone network 86, the off-hook simulator/audio codec 204 appears like an ordinary off-hook telephone. The audio codec decodes a digital voice signal from the central office SVD modem 208 to an analog voice signal to be transmitted to the switched telephone network 86. The data portion of the simultaneous voice and data signal is routed from the central office SVD modem 208 to one of any of the high speed services 89, 91, etc.

If an incoming telephone call from the switched telephone network 86 occurs while in the high speed data service state 237 (condition 267), the line activity detector 104 would detect the ring signal or the caller identification information that the central office 53 would normally transmit on the local loop 59 in the event of regular telephone service. Upon detecting the incoming telephone call, the line activity detector 104 informs the loop interceder control mechanism 114 of the incoming call, to which the loop interceder control mechanism responds by entering the SVD state 251 and rings the modem telephone 203. The second switching mechanism S2 is moved to position B and the telephone call is answered with the off-hook simulator/audio codec 204 acting as a normal telephone while providing a digitized signal to the central office SVD modem 208 which is combined with the data signal to produce the simultaneous voice and data signal transmitted to the end user SVD modem 207.

Turning attention to the POTS/HSD on hold state 254, in this state the switching mechanism S1 is in the A position thereby connecting the local loop directly to the switched telephone network 86. The line telephone 61 is off-hook, while the modem telephone 203 is idle and, therefor, unresponsive. The second switching mechanism S2 is in the A position as well and high speed data communication is on-hold.

If, while in the POTS/HSD on hold state 254, the line telephone goes on-hook (condition 274), the loop interceder control mechanism 114 changes to the high speed data service state 237 and high speed data communication is resumed.

Finally, in the SVD state 251, the switching mechanism S1 is in position B and the second switching mechanism S2 is also in position B. The modem telephone 203 is in a virtual connection with the switched telephone network 86 having been encoded into, and decoded from the simultaneous voice and data signal transmitted between the end user SVD modem 207 and the central office SVD modem 208. The line telephone is idled and there is no dial tone when off-hook.

If in the SVD state 251 the modem telephone goes on-hook (condition 281), then the loop interceder control mechanism 114 changes back to the high speed data service state as there is no more voice signal to transmit.

Figure 7:
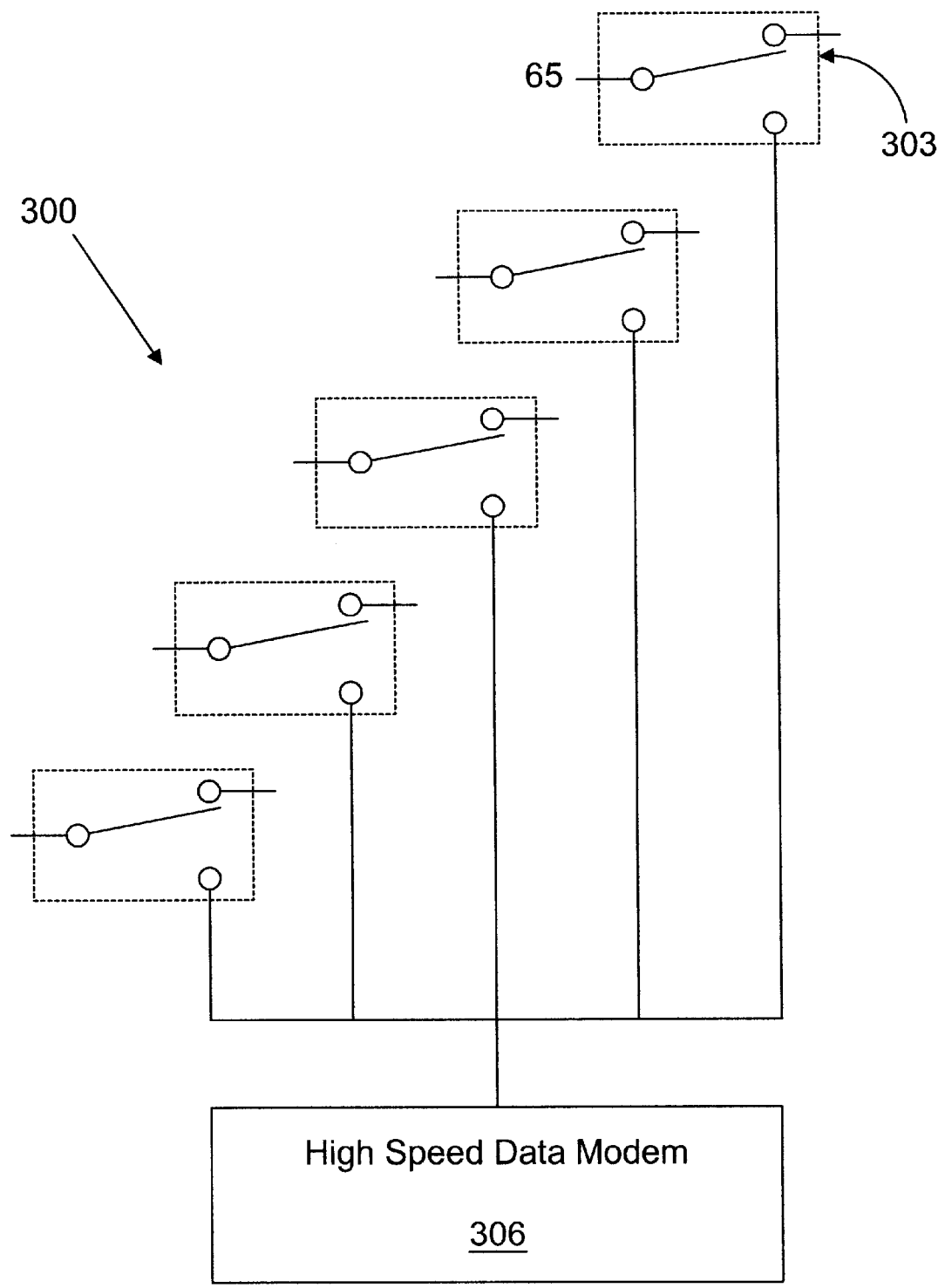
FIG. 7 is a schematic diagram which shows the use of the local loop interceder of FIGS. 1 or 4 in a configuration with a single high speed modem distributed to multiple local loops.

Turning next to FIG. 7, a schematic of a shared high speed modem configuration 300 according to one aspect of the instant invention is shown. In the shared configuration 300, five different local loop interceders 303 interface with a single high speed modem 306. The local loop interceders 303 may be of the type detailed in the first embodiment or the second embodiment of the present invention. The shared configuration 300 allows a single high speed data modem 306 to be used by several local loops 59, although only a single local loop 59 may access the shared high speed data modem 306 at a time. Therefore, the shared high speed data modem 306 can place communications over one local loop 59 into high speed data mode through the techniques for communication via a single local loop 59, as described hereinbefore. When the modem 306 is providing data service to a local loop 59, the configuration 300 may be designed to return a busy signal to all other attempts to connect to modem 306.

Figure 8:
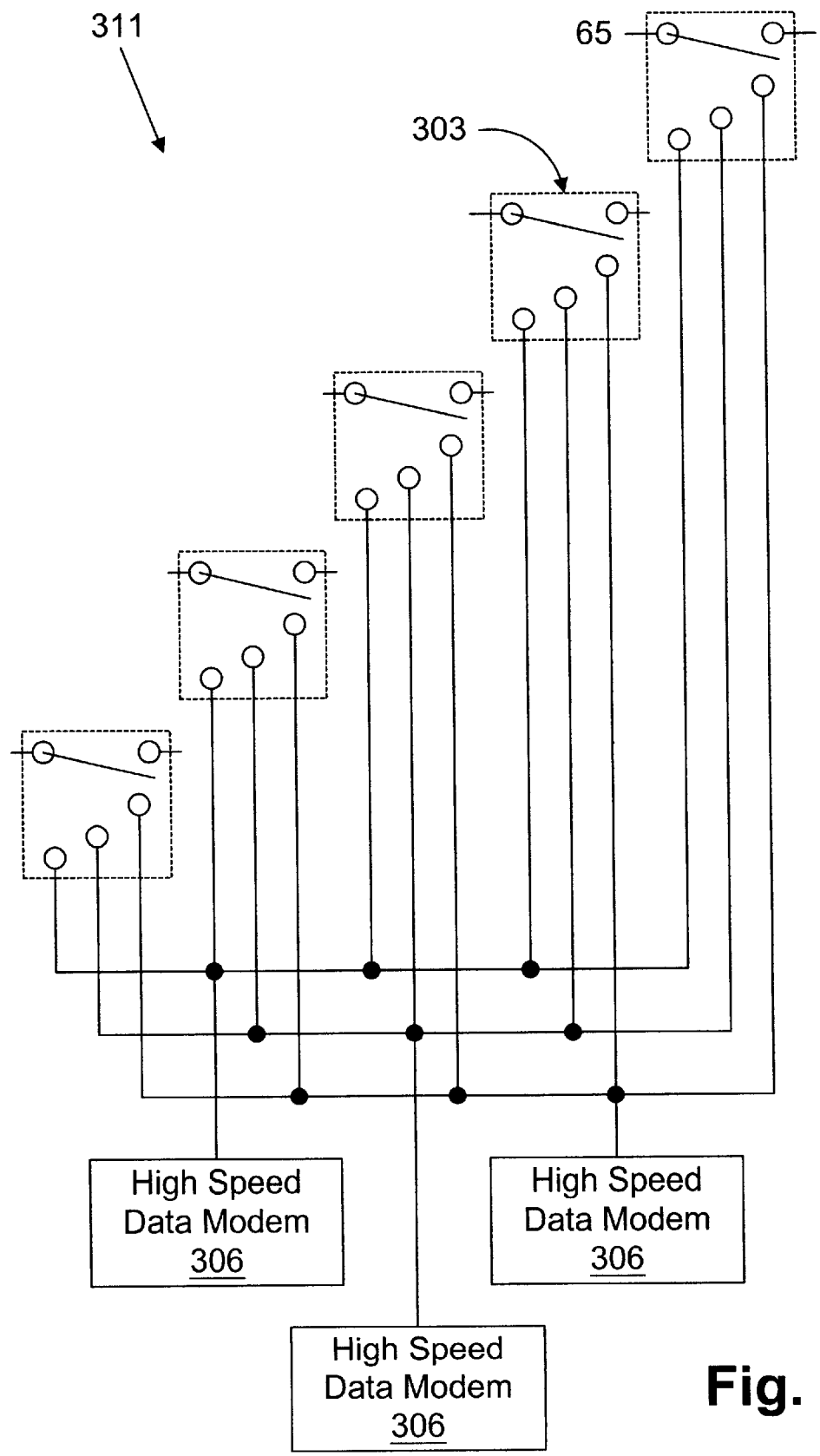
FIG. 8 is a schematic diagram which shows the use of the local loop interceder of FIGS. 1 or 4 in a configuration with multiple high speed modems distributed to multiple local loops.

Referring then, to FIG. 8, shown is a second shared high speed data modem configuration 311. This configuration allows the local loop interceders 303 to choose among three different high speed data modems 306, depending upon which is available. The second shared modem configuration 311 provides an ability to handle greater demand for high speed data service from the high speed modems 306. It should be apparent to one skilled in the art that matrix switching techniques can be applied to configuration 311 so that each high speed data modem 306 services communications on one of the local loops 59, as described hereinabove.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, the following is claimed:

1. A local loop interceder for electrically coupling a central office switched telephone network, a high speed data communication device, and a local loop to facilitate voice and high speed data communication, comprising:
   a switching mechanism having a first position and a second position, said switching mechanism defining a first signal pathway when in said first position, and a second signal pathway when in said second position;
   said first signal pathway disposed to selectively couple the local loop to said central office switched telephone network;
   said second signal pathway disposed to selectively couple the local loop to said high speed data communication device;
   a line activity detector electrically coupled to said first signal pathway, said line activity detector adapted to sense an incoming telephone call from said central office switched telephone network;
   a control signal detector electrically coupled to said local loop, said control signal detector adapted to sense at least a standard 4 KHz telephone signal and a high speed data communications signal on said local loop; and
   a control bus electrically coupled to said switching mechanism, said control signal detector, and said line activity detector, said control bus being adapted to facilitate electrical communication between said switching mechanism, said control signal detector, said line activity detector, and an external control mechanism, such that when said incoming telephone call is sensed said switching mechanism defines the first signal pathway, such that when said standard 4 KHz telephone signal is sensed said switching mechanism defines the first signal pathway, such that when said high speed data communications signal is sensed said switching mechanism defines the second signal pathway, and such that when the local loop is selectively coupled to one of said first signal pathway and said second signal pathway, communications over the nonselected pathway is prevented.

2. The local loop interceder of claim 1, wherein the switching mechanism is adapted to locate its position in response to signals on said control bus from the external control mechanism which in turn is responsive to signals from said line activity detector and said control signal detector.

3. The local loop interceder of claim 2, wherein said first signal pathway is adapted to communicate said standard 4 KHz telephone signal, and said second signal pathway is adapted to communicate said high speed data communications signal.

4. The local loop interceder of claim 1, wherein the external control mechanism is a loop interceder control mechanism.

5. The local loop interceder of claim 4, wherein the loop interceder control mechanism resides in a modem.

6. The local loop interceder of claim 1, further comprising a loop current source.

7. The local loop interceder of claim 6, wherein the loop interceder control mechanism resides in a modem.

8. A local loop interceder, comprising:
   a local loop port for connection to a local loop;
   a central office switched telephone network port for connection to a switched telephone network;
   a high speed modem port for connection to a high speed data communication device;
   a switching mechanism having a first position and a second position, said switching mechanism defining a first signal pathway when in said first position, and a second signal pathway when in said second position;
   said first signal pathway disposed to selectively couple said local loop port to said central office switched telephone network port;
   said second signal pathway disposed to selectively couple the local loop port to said high speed modem port;
   a line activity detector electrically coupled to said first signal pathway, said line activity detector adapted to sense signal activity on said first signal pathway;
   a control signal detector electrically coupled to said first signal pathway and to said second signal pathway, said control signal detector adapted to sense signal activity on said first signal pathway and on said second signal pathway, said control signal detector being adapted to sense at least a standard 4 KHz telephone signal and a high speed data communications signal on said local loop, and
   a control bus port for connection of a control bus to the high speed data communication device, wherein the control bus is electrically coupled to said switching mechanism, said control signal detector, and said line activity detector, said control bus being adapted to facilitate electrical communication between said switching mechanism, said control signal detector, said line activity detector, and an external control mechanism through said control bus port, such that when said signal activity on said first signal pathway is sensed said switching mechanism defines the first signal pathway, such that when said standard 4 KHz telephone signal is sensed said switching mechanism defines the first signal pathway, such that when said high speed data communications signal is sensed said switching mechanism defines the second signal pathway, and such that when the local loop is selectively coupled to one of said first signal pathway and said second signal pathway, communications over the nonselected pathway is prevented.

9. The local loop interceder of claim 8, wherein the switching mechanism is adapted to locate its position in response to signals on said control bus from the external control mechanism which in turn is responsive to signals from said line activity detector and said control signal detector.

10. The local loop interceder of claim 9, wherein said first signal pathway is adapted to communicate a standard 4 KHz telephone signal, and said second signal pathway is adapted to communicate high speed data signals.

11. The local loop interceder of claim 8, wherein the external control mechanism is a loop interceder control mechanism.

12. A method for electrically coupling a switched telephone network, a data communication network, and a local loop to facilitate voice and data communications, comprising the steps of:

detecting with a control signal detector at least a standard 4 KHz telephone signal and a high speed data communications signal from said local loop;

communicating a first signal over a control bus to a loop interceder control mechanism, the first signal corresponding to the detected standard 4 KHz telephone signal;

detecting with a line activity detector activity on a first signal pathway coupling said local loop to said switched telephone network and on a second pathway coupling said local loop to said data communication device;

communicating a second signal over the control bus to the loop interceder control mechanism, the second signal corresponding the detected activity;

communicating a third signal over the control bus generated by the loop interceder control mechanism to a switching mechanism to select said first pathway and to deselect said second pathway when the standard 4 KHz telephone signal is detected, and further selectively blocking the high speed data communications signal so that the standard 4 KHz telephone signal on the first pathway is not interrupted; and communicating a fourth signal over the control bus generated by the loop interceder control mechanism to the switching mechanism to select said second pathway and to deselect said first pathway when the high speed data communications signal is detected, and further selectively blocking the standard 4 KHz telephone signal so that the high speed data communications signal on the first pathway is not interrupted, wherein the control signal detector, the line activity detector, the switching mechanism and the loop interceder control mechanism are coupled together via the control bus.

13. The method of claim 12, further comprising the step of operating in an idle state when the absence of the standard 4 kHz telephone signal is detected and the absence of the high speed data communications signal is detected.

14. The method of claim 13, further comprising the step of selecting said first pathway and deselecting said second pathway when operating in the idle state.

15. The method of claim 12, wherein the step of detecting at least a standard 4 KHz telephone signal further comprises the step of detecting a ring signal.

16. The method of claim 12, wherein the step of detecting at least a standard 4 KHz telephone signal further comprises the step of detecting a caller identification signal.

17. A computer readable medium having a program for electrically coupling a switched telephone network, a data communication device, and a local loop to facilitate voice and data communications, the program comprising:

logic configured to detect with a control signal detector at least a standard 4 KHz telephone signal and a high speed data communications signal from said local loop;

logic configured to communicate a first signal over a control bus to a loop interceder control mechanism, the first signal corresponding to the detected standard 4 KHz telephone signal;

logic configured to detect with a line activity detector activity on a first signal pathway coupling said local loop to said switched telephone network and on a second pathway coupling said local loop to said data communication device;

logic configured to communicate a second signal over the control bus to the loop interceder control mechanism, the second signal corresponding the detected activity;

logic configured to communicate a third signal generated by the loop interceder control mechanism over the control bus to a switching mechanism to select said first pathway and deselect said second pathway when the standard 4 KHz telephone signal is detected, and further configured to selectively block the high speed data communications signal so that the standard 4 KHz telephone signal on the first pathway is not interrupted; and logic configured to communicate a fourth signal generated by the loop interceder control mechanism over the control bus to the switching mechanism to select said second pathway and to deselect said first pathway when the high speed data communications signal is detected, and further configured to selectively block the standard 4 KHz telephone signal so that the high speed data communications signal on the first pathway is not interrupted, wherein the control signal detector, the line activity detector, the switching mechanism and the loop interceder control mechanism are coupled together via the control bus.

18. A local loop interceder for electrically coupling a central office switched telephone network, a high speed data communication device, and a local loop to facilitate voice and high speed data communication, comprising:

a first signal pathway disposed to selectively couple the local loop to the central office switched telephone network;

a second signal pathway disposed to selectively couple the local loop to the high speed data communication device;

a switching mechanism having at least a first position and a second position, such that when in the first position only the first signal pathway is established, and such that when in the second position only the second signal pathway is established;
a line activity detector coupled between the switching mechanism and the central office switched telephone network, and configured to sense at least an incoming telephone call from the central office switched telephone network, and further configured to generate an incoming telephone call condition signal in response to sensing the incoming telephone call;
a control signal detector coupled between the switching mechanism and the local loop, the control signal detector configured to:
sense a high speed data communication request signal on the local loop, and further configured to generate a high speed data request signal in response to sensing the high speed data communication request signal,
sense a telephone off-hook signal on the local loop, and further configured to generate an off-hook condition signal in response to sensing the telephone off-hook signal, and
sense a telephone on-hook signal on the local loop, and further configured to generate an on-hook condition signal in response to sensing the telephone on-hook signal;
a control mechanism configured to receive the incoming telephone call condition signal from the line activity detector, and configured to receive the high speed data request signal, the off-hook condition signal and the on-hook condition signal from the control signal detector, and further configured to communicate a control signal to the switching mechanism such that the switching mechanism establishes the first signal pathway when the control mechanism receives the incoming telephone call condition signal and the off-hook condition signal, and such that the switching mechanism establishes the second signal pathway when the control mechanism receives the high speed data communication request signal; and
a control bus electrically coupled to said control mechanism, said control signal detector, and said line activity detector, said control bus being adapted to facilitate electrical communication between said control mechanism, said control signal detector, said line activity detector, and a loop interceder control mechanism.

19. The local loop interceder of claim 18, wherein the line activity detector is configured to sense the incoming telephone call from the switched telephone network by sensing a ring signal, and such that the incoming telephone call condition signal is generated in response to sensing the ring signal.

20. The local loop interceder of claim 18, wherein the line activity detector is configured to sense the incoming telephone call from the switched telephone network by sensing a caller identification signal, and such that the incoming telephone call condition signal is generated in response to sensing the caller identification signal.

21. The local loop interceder of claim 18, wherein the control mechanism is further configured to change from an idle state to a plain old telephone system (POTS) state such that the control signal communicated to the switching mechanism establishes the first signal pathway, and further configured to remain in the POTS state until the on-hook condition signal is received.

22. The local loop interceder of claim 21, wherein the control mechanism is further configured to change back to the idle state when the on-hook condition signal is received.

23. The local loop interceder of claim 18, wherein the control mechanism is further configured to change from an idle state to a high speed data service state such that the control signal communicated to the switching mechanism establishes the second signal pathway, and further configured to remain in the high speed data service state until a high speed data communication over the second signal pathway is terminated.

24. The local loop interceder of claim 23, wherein the control mechanism is further configured to change back to the idle state when the high speed data communication over the second signal pathway is terminated.

25. The local loop interceder of claim 23, wherein the incoming telephone call from the central office switched telephone network is rejected when the control mechanism is in the high speed data service state.

26. The local loop interceder of claim 18, wherein the control mechanism is further configured to change from an idle state to a high speed data service state such that the control signal communicated to the switching mechanism establishes the second signal pathway so that a high speed data communication is communicated between the local loop and the high speed data communication device, and wherein the control mechanism is further configured to change from the high speed data service state to a plain old telephone system (POTS) state such that the control signal communicated to the switching mechanism establishes the first signal pathway so that the high speed data communication is interrupted.

27. The local loop interceder of claim 18, further comprising a loop current source coupled to the second signal pathway, the loop current source configured to provide current to the local loop when the second signal pathway is established.

28. The local loop interceder of claim 18, further comprising:
a third signal pathway disposed to selectively couple the local loop to a central office simultaneous voice and data (SVD) modem; and
a second switching mechanism coupled between the switching mechanism and the central office SVD modem, the second switching mechanism having an open position and a closed position such that when the second switching mechanism is in the open position the third signal pathway is open, and such that when the second switching mechanism is in the closed position and the first signal pathway is established, the third signal pathway is established such that a SVD communication between the local loop and the central office SVD modem is enabled.

29. The local loop interceder of claim 28, wherein the SVD communication from the local loop is communicated by an end user SVD modem coupled to the local loop.

30. A method for selectively coupling a local loop to a switched telephone network and a data communication device using a switching mechanism, a control signal detector, a line activity detector and a local loop interceder mechanism, comprising the steps of:
changing a state of the loop interceder control mechanism from an idle state to a plain old telephone system (POTS) state in response to an incoming telephone call from the switched telephone network detected by the control signal detector, such that a first signal pathway is established so that the local loop is coupled to the switched telephone network by the switching mechanism to facilitate the incoming telephone call;
returning to the idle state from the POTS state upon the conclusion of the incoming telephone call;

changing from the idle state to the POTS state in response to an off-hook signal from the local loop detected by the line activity detector, such that the first signal pathway is established so that the local loop is coupled to the switched telephone network by the switching mechanism to facilitate a telephone call associated with the off-hook signal;

returning to the idle state from the POTS state upon the conclusion of the telephone call;

changing from the idle state to a high speed data state in response to a modem request signal on the local loop detected by the line activity detector, such that a second signal pathway is established so that the local loop is coupled to the data communication device by the switching mechanism to facilitate a high speed data communication associated with the modem request signal; and returning to the idle state from the high speed data state upon the conclusion of the high speed data communication, wherein the switching mechanism, the control signal detector, the line activity detector and the loop interceder control mechanism are coupled together via a control bus.

31. The method of claim 30, further comprising the steps of:

actuating the switching mechanism to a first position in response to the incoming telephone call from the switched telephone network such that the first signal pathway is established;

actuating the switching mechanism to the first position in response to the off-hook signal on the local loop such that the first signal pathway is established;

actuating the switching mechanism to a second position in response to the modem request signal on the local loop such that the second signal pathway is established.

32. The method of claim 31, further comprising the steps of:

detecting the occurrence of the incoming telephone call from the switched telephone network;

detecting the occurrence of the off-hook signal on the local loop;

detecting the occurrence of an on-hook signal on the local loop; and detecting the occurrence of a high speed data communication request signal on the local loop, the high speed data communication request signal corresponding to the modem request signal.

33. The method of claim 31, further comprising the steps of:

communicating to a control mechanism an incoming telephone call condition signal in response to the incoming telephone call, wherein the control mechanism actuates the switching mechanism to the first position to perform the step of changing from the idle state to the POTS state;

communicating to the control mechanism the off-hook condition signal in response to the off-hook signal, wherein the control mechanism actuates the switching mechanism to the first position to perform the step of changing from the idle state to the POTS state;

communicating to the control mechanism an on-hook condition signal in response to an on-hook signal, wherein the control mechanism performs the step of changing from the POTS state to the idle state; and communicating to the control mechanism a high speed data request signal in response to the modem request signal, wherein the control mechanism performs the step of changing from the idle state to the high speed data state.

34. The method of claim 30, wherein the step of changing from the idle state to the high speed data state in response to the modem request signal further comprising the steps of:

changing from the high speed data state to the POTS state such that the high speed data communication is interrupted and the first signal pathway is established in response to the incoming telephone call from the switched telephone network; and changing from the POTS state back to the high speed data state upon the conclusion of the incoming telephone call such that the second signal pathway is reestablished and such that the interrupted high speed data communication is reinstated.

35. The method of claim 30, wherein the step of changing from the idle state to the high speed data state in response to the modem request signal further comprising the steps of:

changing from the high speed data state to the POTS state such that the high speed data communication is interrupted and the first signal pathway is established in response to the off-hook signal; and changing from the POTS state back to the high speed data state upon the conclusion of the telephone call associated with the off-hook signal such that the second signal pathway is reestablished and such that the interrupted high speed data communication is reinstated.

36. The method of claim 30, wherein the step of changing from the idle state to the high speed data state in response to the modem request signal further comprising the steps of:

maintaining the high speed data state during the high speed data communication when the off-hook signal is sensed; and maintaining the high speed data state during the high speed data communication when the incoming telephone call from the switched telephone network is sensed.

37. The method of claim 36, wherein the step of maintaining the high speed data state when the off-hook signal is sensed further comprises the step of preventing a dial tone to a telephone coupled to the local loop.

38. The method of claim 36, wherein the step of maintaining the high speed data state when the incoming telephone call from the switched telephone network is sensed further comprises the step of allowing a ring signal associated with the incoming telephone call to continue ringing without being answered.

39. The method of claim 30, further comprising the steps of:

changing from the idle state to a simultaneous voice and data (SVD) state in response to the incoming telephone call from the switched telephone network such that a third signal pathway is established so that the local loop is coupled to the switched telephone network and a central office SVD modem using a second switching mechanism to facilitate an SVD communication; and returning to the idle state from the SVD state upon the conclusion of the SVD communication.

40. An interceder system, comprising:

at least one high speed data communication device having a loop interceder control mechanism; and a plurality of loop interceders, each loop interceder coupled to the high speed data modem and further comprising:

a local loop port for connection to a local loop;

a central office switched telephone network port for connection to a switched telephone network;

a high speed modem port for connection to the high speed data communication device;

a switching mechanism having a first position and a second position, said switching mechanism defining a first signal pathway when in said first position, and a second signal pathway when in said second position;

said first signal pathway disposed to selectively couple said local loop port to said central office switched telephone network port;

said second signal pathway disposed to selectively couple the local loop port to said high speed modem port;

a line activity detector electrically coupled to said first signal pathway, said line activity detector adapted to sense signal activity on said first signal pathway;

a control signal detector electrically coupled to said first signal pathway and to said second signal pathway, said control signal detector adapted to sense signal activity on said first signal pathway and on said second signal pathway, said control signal detector being adapted to sense at least a standard 4 KHz telephone signal and a high speed data communications signal on said local loop; and a control bus port for connection of a control bus to the high speed data communication device, wherein the control bus is electrically coupled to said switching mechanism, said control signal detector, and said line activity detector, said control bus being adapted to facilitate electrical communication between said switching mechanism, said control signal detector, said line activity detector, and said loop interceder control mechanism through said control bus port, such that when said signal activity on said first signal pathway is sensed said switching mechanism defines the first signal pathway, such that when said standard 4 KHz telephone signal is sensed said switching mechanism defines the first signal pathway, such that when said high speed data communications signal is sensed said switching mechanism defines the second signal pathway, and such that when the local loop is selectively coupled to one of said first signal pathway and said second signal pathway, communications over the nonselected pathway is prevented.

* * * * *